United States Patent
Drezner et al.

(10) Patent No.: US 6,912,255 B2
(45) Date of Patent: Jun. 28, 2005

(54) BIT RATE CONTROL THROUGH SELECTIVE MODIFICATION OF DCT COEFFICIENTS

(75) Inventors: David Drezner, Ra'anana (IL); Yair Hougui, Tel-Mond (IL)

(73) Assignee: Mobixell Netwoks Inc., Wilmington, DE (US)

( * ) Notice: Subject to any disclaimer, the term of this patent is extended or adjusted under 35 U.S.C. 154(b) by 575 days.

(21) Appl. No.: 10/157,397

(22) Filed: May 30, 2002

(65) Prior Publication Data

US 2003/0223492 A1 Dec. 4, 2003

(51) Int. Cl.[7] ............................................. H04N 7/12
(52) U.S. Cl. ................................................. 375/240.2
(58) Field of Search ..................... 375/240.2, 240.12, 375/240.18, 240.03, 240.22; 348/404.1, 418.1; 382/239, 245, 246, 250, 251, 253; H04N 7/12

(56) References Cited

U.S. PATENT DOCUMENTS

| | | | | |
|---|---|---|---|---|
| 5,005,076 A | * | 4/1991 | Stroppina et al. | 348/400.1 |
| 5,686,962 A | * | 11/1997 | Chung et al. | 375/240.16 |
| 5,990,955 A | * | 11/1999 | Koz | 375/240.01 |
| 6,026,190 A | * | 2/2000 | Astle | 382/232 |
| 6,788,347 B1 | * | 9/2004 | Kim et al. | 348/441 |

* cited by examiner

*Primary Examiner*—Nhon Diep
(74) *Attorney, Agent, or Firm*—AlphaPatent Associates Ltd.; Daniel J. Swirsky

(57) ABSTRACT

An encoder including a DCT transformator for receiving an image or video frame and performing DCT transformation upon a pixel block in a macroblock of the frame, thereby providing a matrix of DCT coefficients, a zig-zag matrix-to-vector converter for receiving the matrix of DCT coefficients from the DCT transformator and creating a one-dimensional vector of DCT coefficients, an analyzer for receiving the one-dimensional vector of DCT coefficients and classifying the macroblock according to a level of detail and edginess, a rate controller for receiving the classification information from the analyzer and selecting DCT filtering parameters, a DCT filter for receiving the DCT filtering parameters selection from the rate controller and implementing the DCT filtering parameters upon the frame, thereby providing a filtered DCT coefficient vector, a quantizer for quantizing the filtered DCT coefficient vector, and a compressor for compressing the quantized results.

20 Claims, 5 Drawing Sheets

BIT RATE CONTROL THROUGH SELECTIVE MODIFICATION OF DCT COEFFICIENTS

FIELD OF THE INVENTION

The present invention relates to image and motion video compression in general, and more particularly to bit-rate control therefor.

BACKGROUND OF THE INVENTION

Standards bodies such as the Moving Picture Experts Group (MPEG) and the Joint Photographic Experts Group (JPEG) specify general methodologies and syntax for generating standard-compliant files and bit streams. Generally, such bodies do not define a specific algorithm needed to produce a valid bit stream, according encoder designers great flexibility in developing and implementing their own specific algorithms in areas such as image pre-processing, motion estimation, coding mode decisions, scalability, and rate control. This flexibility fosters development and implementation of different algorithms, thereby resulting in product differentiation in the marketplace. However, a common goal of encoder designers is to minimize subjective distortion for a prescribed bit rate and operating delay constraint.

In the area of bit-rate control, MPEG and JPEG also do not define a specific algorithm for controlling the bit-rate of an encoder. It is the task of the encoder designer to devise a rate control process for controlling the bit rate such that the decoder input buffer neither overflows nor underflows. A fixed-rate channel is assumed to carry bits at a constant rate to an input buffer within the decoder. At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the encoder to monitor the number of bits generated by the encoder, thereby preventing the overflow and underflow conditions.

One common method for bit-rate control in MPEG and JPEG encoders, which employ Discrete Cosine Transformation (DCT), involves modifying the quantization step. However, it is well known that modifying the quantization step affects the distortion of the input video image. The distortion of the lower DCT coefficients causes "blockiness," while distortion of the higher DCT coefficients causes blurriness. It is well know that the Human Visual System (HVS) prefers greater distortion for higher frequency DCT components than for lower frequency components. This is because, generally speaking, most image content is in the low frequency range. This is due to a high correlation between adjacent pixels. Unfortunately, known MPEG and JPEG encoders that attempt to control bit-rate by modifying the quantization step do not distribute the distortion between low and high frequency coefficients in a way that is optimal for the HVS. For example, when using uniform quantizers, uniform distortion is caused among low and high frequency components. This is not optimal for HVS which prefers more distortion among high frequency components rather than among low frequency components. By contrast, quantization matrices cause more distortion among high frequency components than among low frequency components, which HVS prefers. However, quantization matrices operate on a per-coefficient basis (i.e., point process) that provides only a rough HVS optimization.

In MPEG and JPEG processing, DCT coefficients are ordered in a "ZigZag" scan and numbered 0–63 in ascending order. Both uniform quantizers and quantization matrices attempt to create sequences of successive zeroes at the end of the scan, since the longer the zero sequence, the fewer variable length coding bits are needed for coding the block, especially when long sequences of zeroes appear at the end of the "ZigZag" scan order. However, neither uniform quantizers nor quantization matrices ensure the creation of sequences of successive zeroes in a deterministic way.

Another method for controlling the bit rate involves discarding high DCT coefficients and only transmitting low DCT coefficients. This method is applied during rate control only when the output bit rate is higher than the target bit rate. This will produce visible artifacts, such as a strong "blurriness effect," in the decoded video image, which human viewers generally find unacceptable. This type of artifact requires that some blocks within a picture be coded more accurately than others. In particular, blocks with less activity require fewer bits than blocks with high activity.

SUMMARY OF THE INVENTION

The present invention provides bit rate control in image and motion video compression systems that overcomes disadvantages of the prior art by employing selective modification of DCT coefficients.

In one aspect of the present invention an encoder is provided including a DCT transformator operative to receive either of an image frame and a video frame and perform DCT transformation upon at least one pixel block in a macroblock of the frame, thereby providing a matrix of DCT coefficients, a zig-zag matrix-to-vector converter operative to receive the matrix of DCT coefficients from the DCT transformator and create a one-dimensional vector of DCT coefficients, an analyzer operative to receive the one-dimensional vector of DCT coefficients and classify the macroblock according to a level of detail and edginess, a rate controller operative to receive the classification information from the analyzer and select DCT filtering parameters, a DCT filter operative to receive the DCT filtering parameters selection from the rate controller and implement the DCT filtering parameters upon the frame, thereby providing a filtered DCT coefficient vector, a quantizer operative to quantize the filtered DCT coefficient vector, and a compressor operative to compress the quantized results.

In another aspect of the present invention the analyzer is operative to determine a level of detail and edginess of the block and classify in accordance with the determination.

In another aspect of the present invention the rate controller is operative to calculate an expectation of the average level of detail and edginess of the frame and determine an estimated bit rate from the expectation.

In another aspect of the present invention the compressor is a variable length coder.

In another aspect of the present invention the compressor is operative to feed back bit rate output information to the rate controller for adjusting the estimated bit rate thereat.

In another aspect of the present invention the analyzer is operative to calculate the absolute peak-to-average (AP2AVR) and sum of absolute values (SAV) of a plurality of regions of the coefficients, and classify the block into at least one class corresponding to a threshold for either of the AP2AVR and SAV measures.

In another aspect of the present invention any of the regions at least partly overlap.

In another aspect of the present invention the classification corresponds to a diagonal of the matrix past which the coefficients are to be set equal to zero.

In another aspect of the present invention the DCT filter is operative to set equal to zero all DCT coefficients in the matrix below the diagonal associated with the block class.

In another aspect of the present invention the rate controller is operative to implement for any of the frames a variable quantization factor for each block in the frame and one quantization value for the frame.

In another aspect of the present invention any of the frames includes at least one region of interest (ROI), and where the DCT filter is selectably operable to implement a different one of the DCT filtering parameters within the ROI and without the ROI.

In another aspect of the present invention an encoder method is provided including performing DCT transformation upon at least one pixel block in a macroblock of either of an image frame and a video frame, thereby providing a matrix of DCT coefficients, converting the matrix to a one-dimensional vector of DCT coefficients, classifying the macroblock according to a level of detail and edginess, selecting DCT filtering parameters associated with the classification, applying the DCT filtering parameters upon the frame, thereby providing a filtered DCT coefficient vector, quantizing the filtered DCT coefficient vector, and compressing the quantized results.

In another aspect of the present invention the method further includes calculating an expectation of the average level of detail and edginess of the frame, and determining an estimated bit rate from the expectation.

In another aspect of the present invention the method further includes receiving feedback bit rate output information and adjusting the estimated bit rate using the feedback information.

In another aspect of the present invention the classifying step includes calculating the absolute peak-to-average (AP2AVR) and sum of absolute values (SAV) of a plurality of regions of the coefficients, and classifying the block into at least one class corresponding to a threshold for either of the AP2AVR and SAV measures.

In another aspect of the present invention the calculating step includes calculating the absolute peak-to-average (AP2AVR) and sum of absolute values (SAV) of a plurality of at least partly overlapping regions of the coefficients.

In another aspect of the present invention the applying step includes setting equal to zero at least one diagonal of the matrix past a diagonal that corresponds to the classification.

In another aspect of the present invention the applying step includes setting equal to zero all diagonals of the matrix past a diagonal that corresponds to the classification.

In another aspect of the present invention the quantizing step includes implementing for any of the frames a variable quantization factor for each block in the frame and one quantization value for the frame.

In another aspect of the present invention the method further includes defining at least one region of interest (ROI) in the frame, and where the applying step includes implementing a different one of the DCT filtering parameters within the ROI and without the ROI.

The disclosures of all patents, patent applications, and other publications mentioned in this specification and of the patents, patent applications, and other publications cited therein are hereby incorporated by reference in their entirety.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
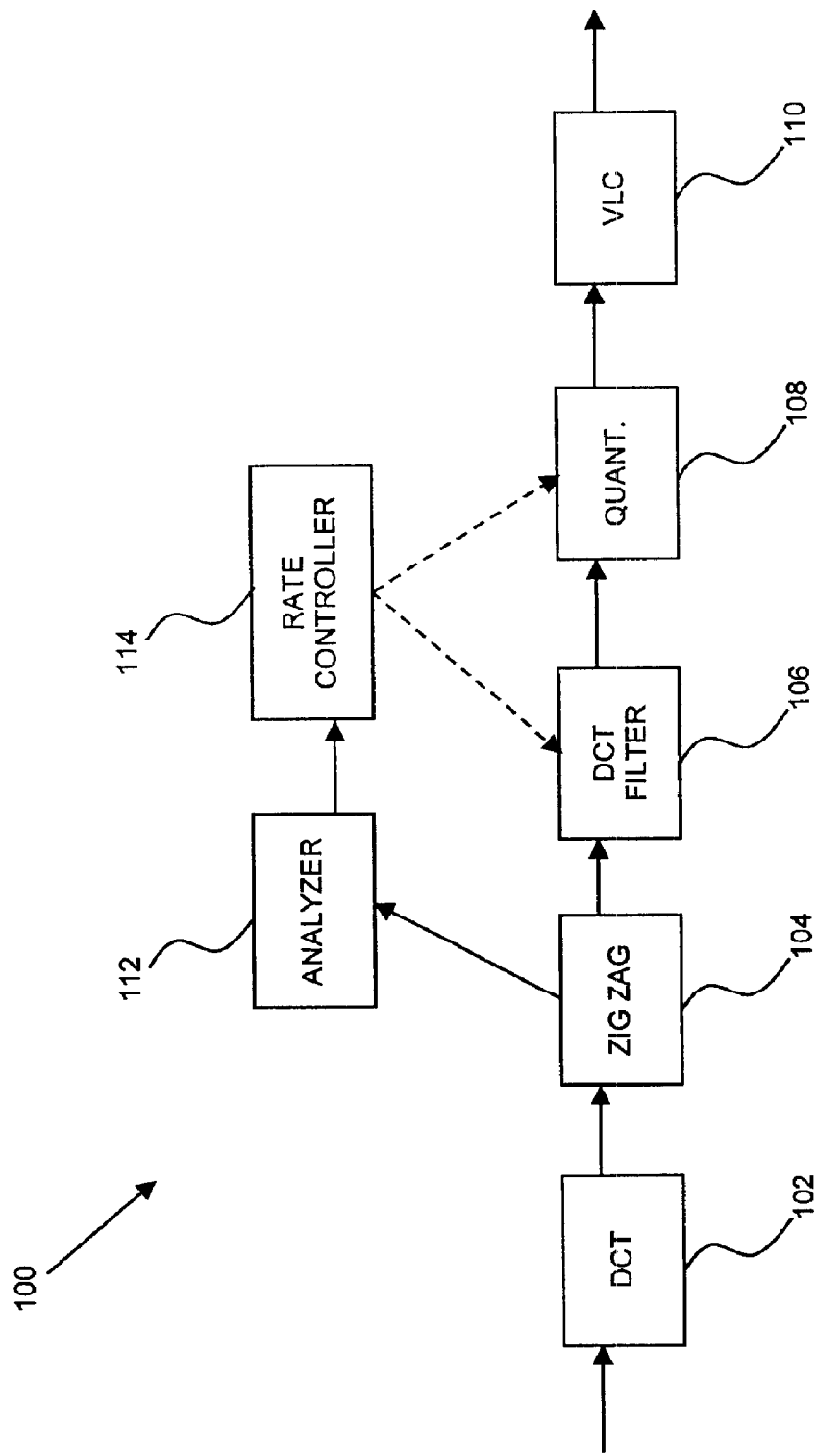
FIG. 1 is a simplified block diagram illustration of an encoding system, constructed and operative in accordance with a preferred embodiment of the present invention.
Figure 2:
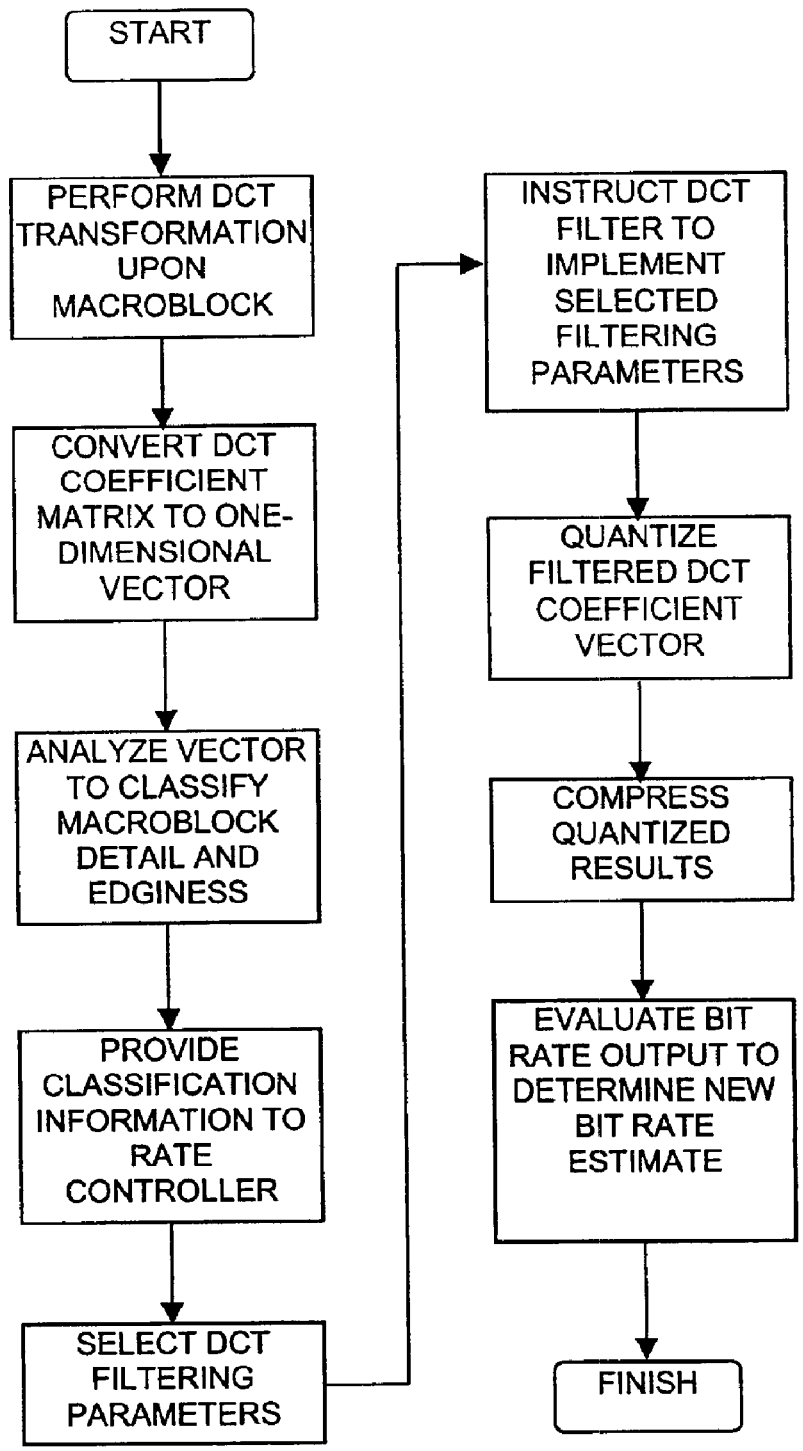
FIG. 2 is a simplified flowchart illustration of an exemplary method of operation of the system of FIG. 1, operative in accordance with a preferred embodiment of the present invention.

Reference is now made to FIG. 1, which is a simplified block diagram illustration of an encoding system, constructed and operative in accordance with a preferred embodiment of the present invention, and additionally to FIG. 2, which is a simplified flowchart illustration of an exemplary method of operation of the system of FIG. 1, operative in accordance with a preferred embodiment of the present invention. In the system of FIG. 1 and method of FIG. 2, an encoder 100, such as may be used for encoding JPEG images or MPEG video, includes a DCT transformator 102 which receives blocks of 8×8 pixels of an image or video frame and performs DCT transformation upon the block. A zig-zag matrix-to-vector converter 104 receives a matrix of DCT coefficients from DCT 102 and creates a one-dimensional vector of DCT coefficients by traversing the matrix in zig-zag order using conventional techniques. The vector is then provided to an analyzer 112 and a DCT filter 106. Analyzer 112 analyzes the vector to determine the level of detail and "edginess" (i.e., extent of edges) of each block in a macroblock, and classifies the macroblock accordingly. A preferred method of operation of analyzer 112 is described in greater detail hereinbelow with reference to FIG. 3. Once analyzer 112 has processed all of the blocks in a frame it provides the classification information to a rate controller 114 which uses the classification information to describe the overall complexity of the frame. Rate controller 114 does so by calculating the expectation of the average level of detail and edginess of the entire frame. Rate controller 114 then uses the expectation to determine an estimated bit rate and selects appropriate DCT filtering parameters and instructs DCT filter 106 to implement the selected filtering parameters accordingly. Thus, rate controller 114 uses DCT filter 106 to control the output bit-rate of the encoder. A preferred method of operation of rate controller 114 is described in greater detail hereinbelow with reference to FIG. 4. The filtered DCT coefficient vector is then quantized at a quantizer 108, and the quantized results are then compressed, such as at a variable length coder (VLC) 110. The bit rate at the output of VLC 110 may be fed back to rate controller 114 so that rate controller 114 may adjust its bit rate estimation. Rate controller 114 may also control quantizer 108 to affect the encoder bit rate using conventional techniques.

Figure 3:
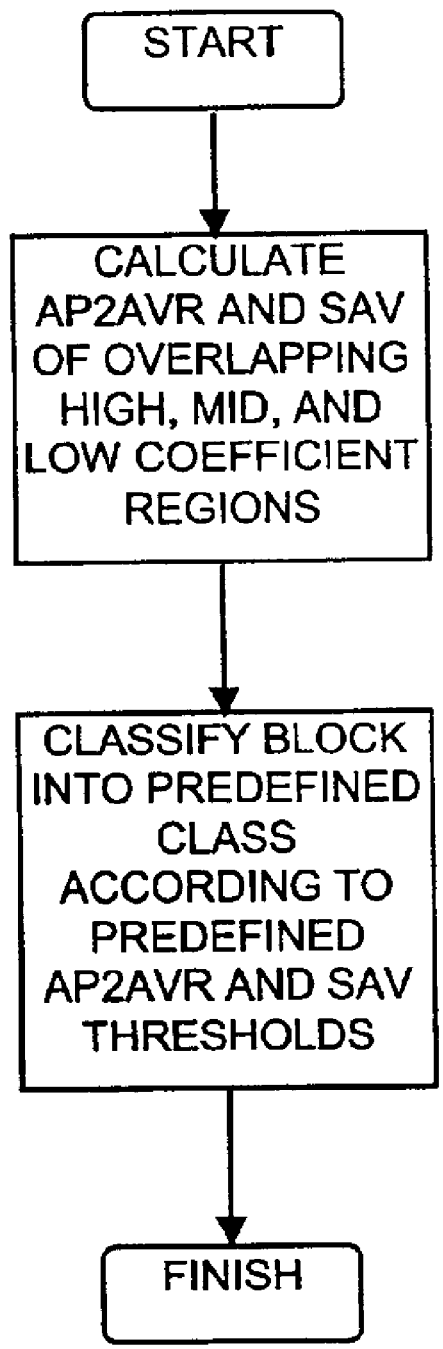
FIG. 3 is a simplified flowchart illustration of a preferred method of operation of analyzer 112 of FIG. 1, operative in accordance with a preferred embodiment of the present invention.

Reference is now made to FIG. 3, which is a simplified flowchart illustration of a preferred method of operation of analyzer 112 of FIG. 1, operative in accordance with a preferred embodiment of the present invention. In the method of FIG. 3, the absolute peak-to-average (AP2AVR) and sum of absolute values (SAV) are taken of one or more regions of coefficients, preferably at least partly overlapping. For example, the AP2AVR and SAV are taken of a first region of coefficients, herein referred to as a "high" measure and preferably including coefficients 22–64, a second region of coefficients, herein referred to as a "mid" measure and preferably including coefficients 16–64, and a third region of coefficients, herein referred to as a "low" measure and preferably including coefficients 7–64. Using a series of thresholds for the various AP2AVR and SAV measures, the block is then classified into one or more classes. For example:

- If the AP2AVR high measure >80 or the SAV high measure >900, classify the block as class 5 (greatest detail/edginess);
- If the AP2AVR high measure >50 or the SAV high measure >820, classify the block as class 4 (less detail/edginess);
- If the AP2AVR mid measure >18 or the SAV mid measure >200, classify the block as class 3;
- If the AP2AVR low measure >8 or the SAV low measure >140, classify the block as class 2;
- Otherwise, classify the block as class 1 (least detail/edginess).

It is appreciated that the above thresholds are for illustration only, and that different values may be used.

Prior to calculating the AP2AVR and SAV, the coefficients in one or more of the matrix diagonals DCT may optionally be multiplied by corresponding weighting values in a corresponding weighted window vector, such as a Hamming, Hanning, or Kaiser window.

Figure 4:
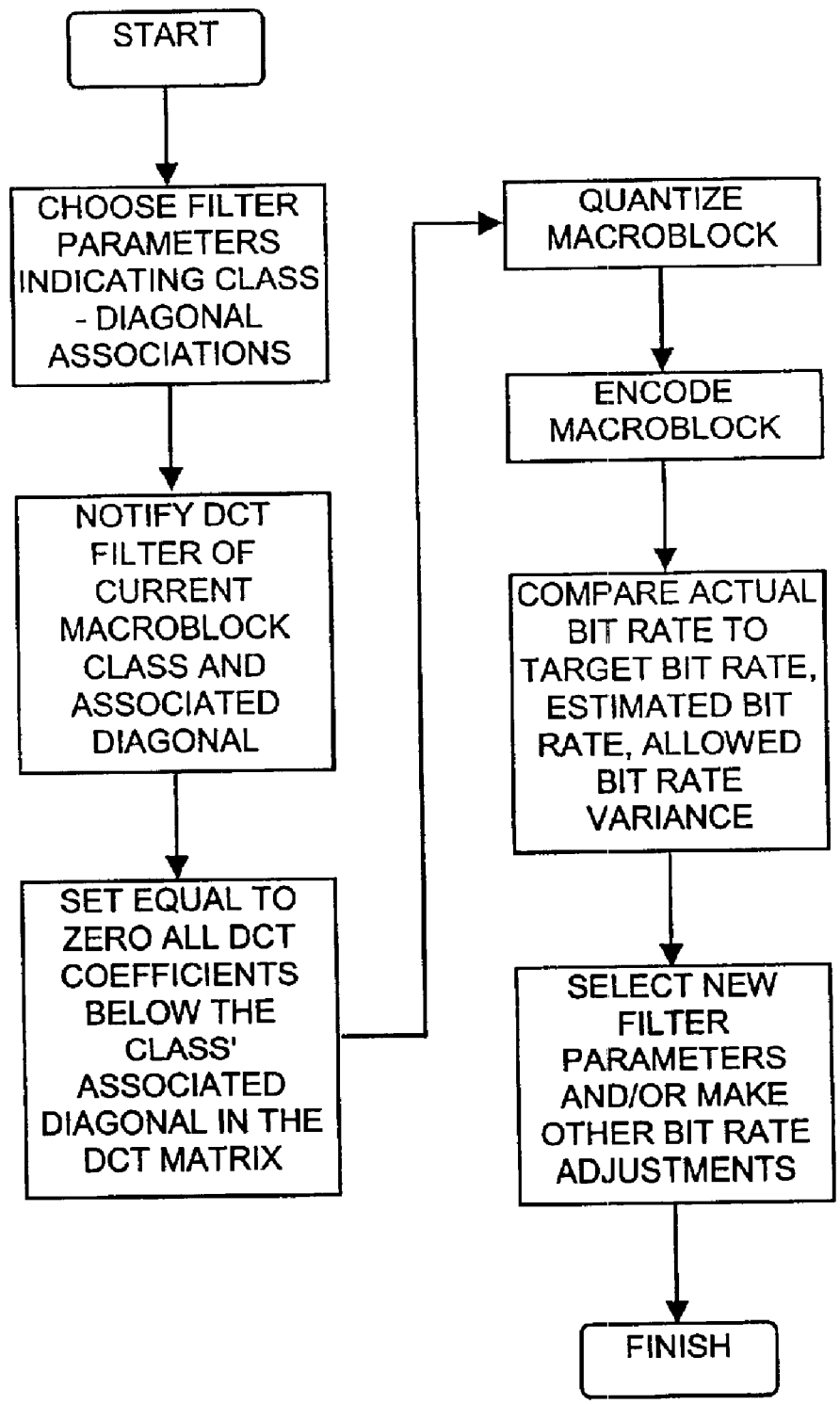
FIG. 4 is a simplified flowchart illustration of a preferred method of operation of rate controller 114 of FIG. 1, operative in accordance with a preferred embodiment of the present invention.
Figure 5:
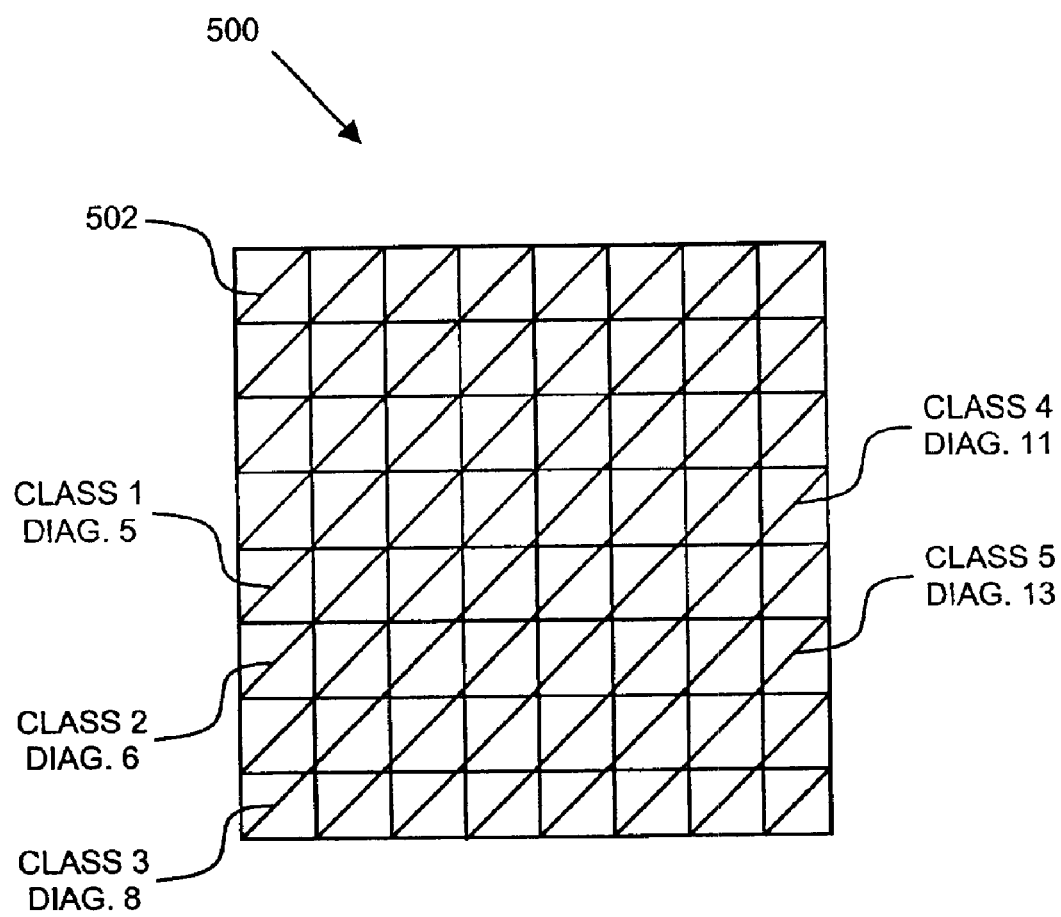
FIG. 5 is a simplified conceptual illustration of an exemplary DCT coefficient matrix, useful in understanding the present invention.

Reference is now made to FIG. 4, which is a simplified flowchart illustration of a preferred method of operation of rate controller 114 of FIG. 1, operative in accordance with a preferred embodiment of the present invention. In the method of FIG. 4, a set of filter parameters is chosen indicating per class the DCT coefficient matrix diagonal past which the coefficients are set equal to zero. By way of illustration, FIG. 5 shows a DCT coefficient matrix of an exemplary block 500 whose coefficients are represented as a series of diagonals 502. A set of filter parameters might, for example, assign class 1 to diagonal 5 (i.e., the fifth diagonal starting with the AC coefficient), class 2 to diagonal 6, class 3 to diagonal 8, class 4 to diagonal 11, and class 5 to diagonal 13. Different filter parameters may be used for different image assumptions, such as for MPEG Intra mode versus Inter mode. Thus, for example, were a block classified as class 1 using the method of FIG. 3, the coefficients of diagonals 6–15 would be set equal to zero, whereas were the block classified as class 3, the coefficients of diagonals 9–15 would be set equal to zero. Rate controller 114 then notifies DCT filter 106 of the class to which the current block belongs and of the diagonal associated with the class. DCT filter 106 then sets equal to zero all DCT coefficients below its class's associated diagonal as the coefficients would appear in the original DCT matrix. The macroblock is then processed normally by quantizer 108 and VLC 110.

New filter parameters may be selected based on analysis of the actual bit rate at VLC 110 as compared with the target bit rate, the estimated bit rate, and an allowed bit rate variance. Additionally or alternatively, the quantization step may be adjusted using known techniques, frames may be dropped, and/or other known bit rate adjustment measures may be taken.

Preferably, analyzer 112 should process macroblocks before quantization, while DCT filter 106 may operate before or after quantization.

It will be appreciated that rate controller 114 may implement a variable quantization factor in a frame for each block, while the stream may have one quantization value per frame. This is particularly advantageous for H.261, H.263 and MPEG-4 simple profile media streams where only one quantization value is allowed per frame. Since H.261, H.263 and MPEG-4 simple profile are targeted for low bit-rate applications, using DCT filter 106 to apply a variable quantization factor is advantageous. It will be further appreciated that a region of interest (ROI) may be set for each frame, thereby allowing a greater or lesser degree of blurriness to be defined within the ROI or without, such as by having DCT filter 106 implement different DCT filtering parameters within the ROI and without.

It will be appreciated that, by zeroing the high-order DCT coefficients from a given diagonal in the DCT matrix, the present invention provides uninterrupted strings of zero values that saves bits and lowers entropy. As a result, the quantizer step may be lowered, resulting in a lower distortion at the low-order diagonals that is optimal for the HVS. A tradeoff between distortion on the high-order and low-order DCT coefficients may be managed to reach optimal HVS input. By lowering the distortion at the low diagonals/coefficients, block artifacts caused by the low diagonal/coefficient distortion is also reduced.

It is appreciated that one or more of the steps of any of the methods described herein may be omitted or carried out in a different order than that shown, without departing from the true spirit and scope of the invention.

While the methods and apparatus disclosed herein may or may not have been described with reference to specific hardware or software, it is appreciated that the methods and apparatus described herein may be readily implemented in hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. An encoder comprising:
   a DCT transformator operative to receive either of an image frame and a video frame and perform DCT transformation upon at least one pixel block in a macroblock of said frame, thereby providing a matrix of DCT coefficients;
   a zig-zag matrix-to-vector converter operative to receive said matrix of DCT coefficients from said DCT transformator and create a one-dimensional vector of DCT coefficients;
   an analyzer operative to receive said one-dimensional vector of DCT coefficients and classify said macroblock according to a level of detail and edginess;
   a rate controller operative to receive said classification information from said analyzer and select DCT filtering parameters;

a DCT filter operative to receive said DCT filtering parameters selection from said rate controller and implement said DCT filtering parameters upon said frame, thereby providing a filtered DCT coefficient vector;

a quantizer operative to quantize said filtered DCT coefficient vector; and a compressor operative to compress said quantized results.

2. An encoder according to claim 1 wherein said analyzer is operative to determine a level of detail and edginess of said block and classify in accordance with said determination.

3. An encoder according to claim 2 wherein said rate controller is operative to calculate an expectation of the average level of detail and edginess of said frame and determine an estimated bit rate from said expectation.

4. An encoder according to claim 1 wherein said compressor is a variable length coder.

5. An encoder according to claim 3 wherein said compressor is operative to feed back bit rate output information to said rate controller for adjusting said estimated bit rate thereat.

6. An encoder according to claim 1 wherein said analyzer is operative to:

calculate the absolute peak-to-average (AP2AVR) and sum of absolute values (SAV) of a plurality of regions of said coefficients, and classify said block into at least one class corresponding to a threshold for either of said AP2AVR and SAV measures.

7. An encoder according to claim 6 wherein any of said regions at least partly overlap.

8. An encoder according to claim 1 wherein said classification corresponds to a diagonal of said matrix past which the coefficients are to be set equal to zero.

9. An encoder according to claim 8 wherein said DCT filter is operative to set equal to zero all DCT coefficients in said matrix below the diagonal associated with said block class.

10. An encoder according to claim 1 wherein said rate controller is operative to implement for any of said frames a variable quantization factor for each block in said frame and one quantization value for said frame.

11. An encoder according to claim 1 wherein any of said frames comprises at least one region of interest (ROI), and wherein said DCT filter is selectably operable to implement a different one of said DCT filtering parameters within said ROI and without said ROI.

12. An encoder method comprising:

performing DCT transformation upon at least one pixel block in a macroblock of either of an image frame and a video frame, thereby providing a matrix of DCT coefficients;

converting said matrix to a one-dimensional vector of DCT coefficients;

classifying said macroblock according to a level of detail and edginess;

selecting DCT filtering parameters associated with said classification;

applying said DCT filtering parameters upon said frame, thereby providing a filtered DCT coefficient vector;

quantizing said filtered DCT coefficient vector; and compressing said quantized results.

13. A method according to claim 12 and further comprising:

calculating an expectation of the average level of detail and edginess of said frame; and determining an estimated bit rate from said expectation.

14. A method according to claim 13 and further comprising receiving feedback bit rate output information and adjusting said estimated bit rate using said feedback information.

15. A method according to claim 12 wherein said classifying step comprises:

calculating the absolute peak-to-average (AP2AVR) and sum of absolute values (SAV) of a plurality of regions of said coefficients, and classifying said block into at least one class corresponding to a threshold for either of said AP2AVR and SAV measures.

16. A method according to claim 15 wherein said calculating step comprises calculating the absolute peak-to-average (AP2AVR) and sum of absolute values (SAV) of a plurality of at least partly overlapping regions of said coefficients.

17. A method according to claim 12 wherein said applying step comprises setting equal to zero at least one diagonal of said matrix past a diagonal that corresponds to said classification.

18. A method according to claim 12 wherein said applying step comprises setting equal to zero all diagonals of said matrix past a diagonal that corresponds to said classification.

19. A method according to claim 12 wherein said quantizing step comprises implementing for any of said frames a variable quantization factor for each block in said frame and one quantization value for said frame.

20. A method according to claim 12 and further comprising defining at least one region of interest (ROI) in said frame, and wherein said applying step comprises implementing a different one of said DCT filtering parameters within said ROI and without said ROI.

* * * * *